(12) United States Patent
Videtich

(10) Patent No.: US 7,174,253 B2
(45) Date of Patent: Feb. 6, 2007

(54) RECEIVING TRAFFIC UPDATE INFORMATION AND REROUTE INFORMATION IN A MOBILE VEHICLE

(75) Inventor: Matt C. Videtich, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/119,294

(22) Filed: Apr. 29, 2005

(65) Prior Publication Data
US 2005/0192033 A1 Sep. 1, 2005

Related U.S. Application Data

(62) Division of application No. 10/191,131, filed on Jul. 9, 2002, now Pat. No. 7,062,379.

(51) Int. Cl.
*G01C 21/32* (2006.01)
(52) U.S. Cl. .................... 701/210; 701/208; 701/209
(58) Field of Classification Search ............. 701/200, 701/201, 202, 203, 204, 205, 206, 207–213; 340/990–995.2; 342/357.1–357.13
See application file for complete search history.

(56) References Cited

U.S. PATENT DOCUMENTS

| | | | | |
|---|---|---|---|---|
| 5,911,773 A * | 6/1999 | Mutsuga et al. | ............. | 701/200 |
| 6,034,626 A * | 3/2000 | Maekawa et al. | ....... | 340/995.21 |
| 6,064,941 A * | 5/2000 | Nimura et al. | ............. | 701/210 |
| 6,169,515 B1 * | 1/2001 | Mannings et al. | ....... | 342/357.1 |
| 6,278,942 B1 * | 8/2001 | McDonough | ............. | 701/210 |
| 6,327,533 B1 * | 12/2001 | Chou | ............. | 701/207 |
| 6,487,496 B2 * | 11/2002 | Katayama et al. | .......... | 701/209 |
| 6,603,405 B2 | 8/2003 | Smith | | |
| 6,657,558 B2 | 12/2003 | Horita et al. | | |
| 6,795,769 B2 * | 9/2004 | Kaji et al. | .................. | 701/209 |
| 6,810,323 B1 * | 10/2004 | Bullock et al. | ............. | 701/206 |

* cited by examiner

*Primary Examiner*—Richard M. Camby
(74) *Attorney, Agent, or Firm*—Anthony Luke Simon

(57) ABSTRACT

The present invention provides a method for receiving traffic update information and reroute information from a telematics service call center in a mobile vehicle. The mobile vehicle monitors a satellite broadcast signal for the traffic update information. The traffic update information is extracted. The mobile vehicle determines whether the traffic update information is relevant to its current route. If the traffic update information is deemed relevant, an alert is signaled.

7 Claims, 4 Drawing Sheets

RECEIVING TRAFFIC UPDATE INFORMATION AND REROUTE INFORMATION IN A MOBILE VEHICLE

RELATED APPLICATIONS

This application is a divisional application of U.S. patent application Ser. No. 10/191,131,filed Jul. 9, 2002, now U.S. Pat. No. 7,062,379, issued on Jun. 13, 2006.

FIELD OF THE INVENTION

This invention generally relates to mobile vehicle navigation systems. More particularly, the present invention relates to the use of a satellite system for broadcasting updates on traffic information to a mobile vehicle.

BACKGROUND OF THE INVENTION

In recent years, great advances have been made in the area of onboard information services for mobile vehicles. Among these services are some that supply the driver of the vehicle with information pertaining to the current driving route. Services exist that calculate a route from the current position to a requested destination. Other services exist that allow one to predefine certain regularly used routes and to then download route information to the car when it is requested. These services, when queried for route information, are capable of supplying an alternate route based upon traffic obstructions—such as accidents or delays due to construction—that exist when the route is requested.

Situations regularly occur, however, in which traffic obstructions arise after route information has been delivered to the vehicle. If the route information service is not re-queried, the driver of the vehicle may remain unaware of the new obstruction. It would be desirable to provide a mobile vehicle with the ability to acquire information regarding updated traffic information.

Information services are currently broadcast in some markets using Radio Data Service (RDS) over Frequency Modulated (FM) radio. Services supplied in this manner may be referred to as FM/RDS services. FM/RDS services use a subcarrier band on Frequency Modulated (FM) transmissions to deliver data. These data may provide a text display of an FM station's name or program details, may provide a table of frequencies to the radio receiver for each station so that car radios can automatically re-tune to the strongest signal, and may also alert the driver to traffic problem reports. One limitation presented through the use of FM/RDS is the relatively narrow broadcast range of standard FM transmissions.

Satellite broadcasts may also contain data on a subcarrier band, and are not subject to the same range limitations presented by standard FM transmissions. The wide range of coverage achieved by satellites presents separate challenges in regards to broadcasting information such as traffic obstruction reports. The vast amount of data required to transmit all obstruction information within the satellite's broadcast area is prohibitive to such an attempt when one considers the finite and limited capacity available via the subcarrier band.

It would be desirable to provide a mobile vehicle with the ability to efficiently process the relevancy of traffic information, this information having been broadcast efficiently using available satellite bandwidth. It would also be desirable to then provide the driver of vehicle with the relevant information and allow the driver to request a more efficient route to the destination.

BRIEF SUMMARY OF THE INVENTION

One aspect of the invention presents a method for receiving traffic update information and reroute information from a telematics service call center in a mobile vehicle. The mobile vehicle monitors a satellite broadcast signal and extracts the traffic update information. If a unit in the mobile vehicle determines that the traffic update information is on a route, an alert signal is sent.

Another aspect of the invention presents a method for determining relevant traffic update information to broadcast in a mobile vehicle communication system via a satellite broadcast system. A telematics service call center receives traffic update information and compares the traffic update information to a list of routes currently engaged by mobile vehicles in the mobile vehicle communication system. The telematics service call center then transmits the traffic update information to a satellite radio uplink facility based upon this comparison.

Another aspect of the invention presents a computer usable medium including a program for receiving traffic update information and reroute information from a telematics service call center in a mobile vehicle. The program monitors a satellite broadcast signal and extracts traffic update information. If the program determines that the traffic update information is on a route, an alert signal is sent.

Another aspect of the invention presents a computer usable medium including a program for determining relevant traffic update information to broadcast in a mobile vehicle communication system via a satellite broadcast system. The program receives traffic update information at a telematics service call center and compares the traffic update information to a list of routes currently engaged by mobile vehicles in the mobile vehicle communication system. The program then transmits the traffic update information to a satellite radio uplink facility based upon this comparison.

Another aspect of the invention presents a system for receiving traffic update information and reroute information from a telematics service call center in a mobile vehicle including means for monitoring a satellite broadcast signal for the traffic update information; means for extracting the traffic update information; means for determining whether the traffic update information is on the route; and means for sending an alert signal based on the determination.

Another aspect of the invention presents a system for determining relevant traffic update information to broadcast in a mobile vehicle communication system via a satellite broadcast system including means for receiving traffic update information at a telematics service call center; means for comparing the traffic update information to a list of routes currently engaged by mobile vehicles in the mobile vehicle communication system; and means for transmitting the traffic update information to a satellite radio uplink facility based upon the comparison.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
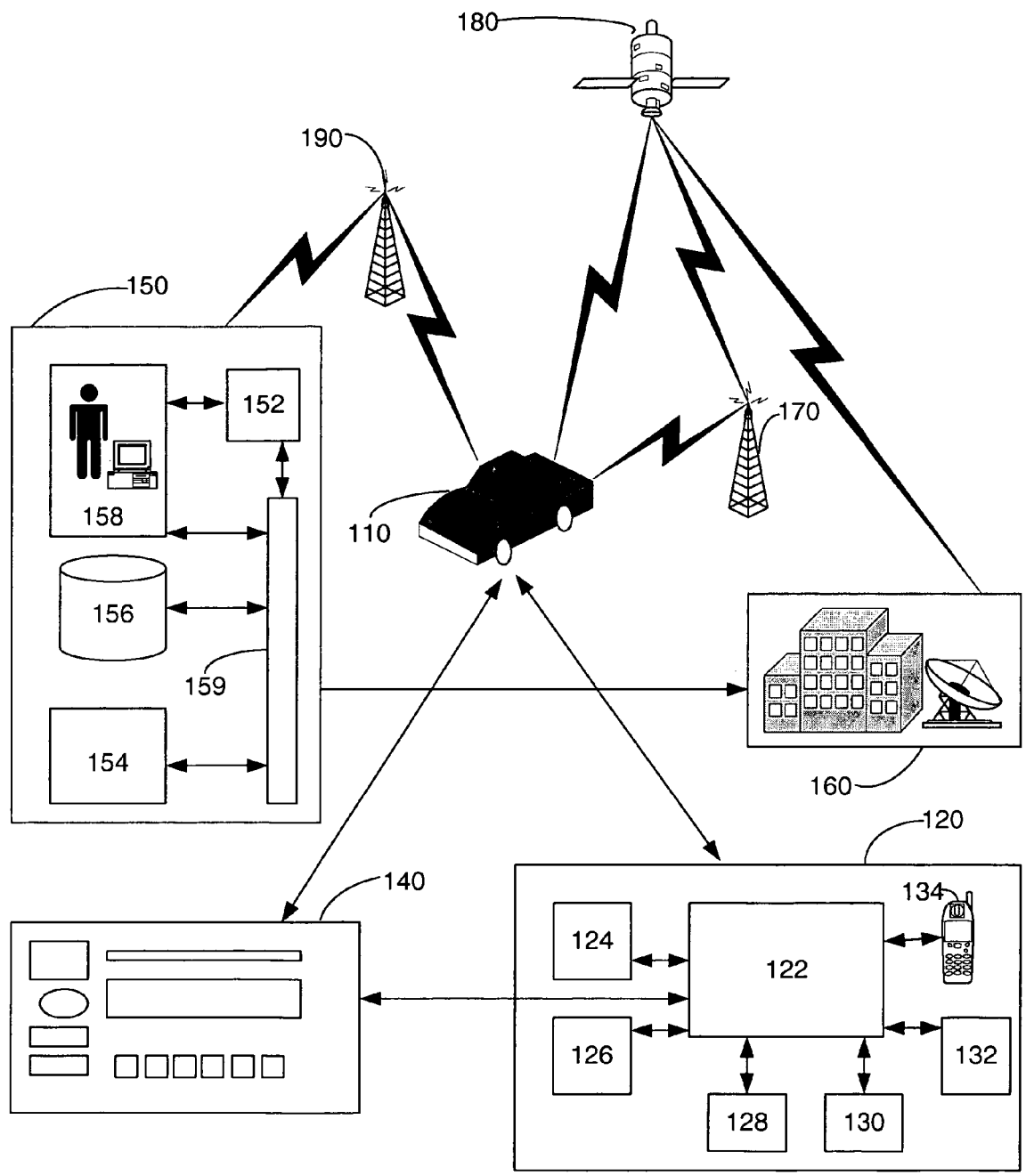
FIG. 1 is a block diagram illustrating one embodiment of a mobile vehicle communication system, in accordance with the present invention.

FIG. 1 illustrates one embodiment of a system for receiving traffic update information and reroute information from a telematics service call center, broadcast via satellite, in a mobile vehicle, in accordance with the present invention, and may be referred to as a mobile vehicle communication system (MVCS) 100. Mobile vehicle communication system (MVCS) 100 may include a mobile vehicle 110, a telematics unit 120, a satellite radio receiver 140, one or more telematics service call centers 150, one or more satellite radio service uplink facilities 160, one or more terrestrial radio transmitters 170, one or more satellite radio service geostationary satellites 180, a cellular phone network, and a wireless carrier system 190.

Mobile vehicle 110 is a vehicle equipped with suitable hardware and software for transmitting and receiving voice and data communications, as is well known in the art. Mobile vehicle 110 contains telematics unit 120. Telematics unit 120 may include a digital signal processor (DSP) 122 connected to a wireless analog, digital or dual-mode modem 124, a global positioning system (GPS) unit 126, an in-vehicle memory 128, a microphone 130, one or more speakers 132, and a network access device (NAD) or in-vehicle mobile phone 134. In-vehicle mobile phone 134 may be an analog, digital, or dual-mode cellular phone. GPS unit 126 provides longitude and latitude coordinates of the vehicle.

DSP 122 uses instructions and data from a computer usable medium that may contain various computer programs for controlling programming and operational modes within mobile vehicle 110. Digital signals are used to activate the programming mode and operation modes, as well as provide input and output data.

Satellite radio receiver 140 is a combination of software and hardware capable of receiving satellite radio broadcast signals in mobile vehicle 110, as is well known in the art. Satellite radio receiver 140 may receive digital signals from one or more terrestrial radio transmitters 170, or from one or more satellite radio service geostationary satellites 180. Satellite radio receiver 140 includes a radio receiver for receiving broadcast radio information over one or more channels. Satellite radio receiver 140 may be embedded within or connected to telematics unit 120, and provide channel and signal information to telematics unit 120. Telematics unit 120 may monitor, filter and send signals that are received from satellite broadcasts, radio broadcasts or other wireless communication systems to output devices such as speaker 132 and visual display devices.

Telemetric service call center 150 is a location where many calls may be received and serviced at the same time, or where many calls may be sent at the same time. The call center facilitates communications to and from mobile vehicle 110. Telematics service call center 150 may be a voice call center, providing verbal communications between an advisor in the call center and a subscriber in a mobile vehicle.

Telematics service call center 150 may contain one or more voice and data switches 152. Switch 152 transmits voice or data transmissions from call center 150. Switch 152 also may receive voice or data transmissions from telematics unit 120 in mobile vehicle 110 through wireless carrier system 140, as is well known in the art. Switch 152 receives and sends data transmissions to and from one or more communication services managers 154 via one or more bus systems 160. Communication services manager 154 is any suitable combination of hardware and software capable of providing requested communication services to telematics unit 120 in mobile vehicle 110. Communication services manager 154 may send to or receive from many different entities including one or more communication services databases 156, one or more communication services advisors 158, all communicating over bus systems 160. Communication services advisor 158 is configured to receive from or send to switch 152 voice or data transmissions.

As part of a satellite broadcast system, a satellite radio uplink facility 160 sends and receives radio signals from a geostationary satellite 180. Satellite radio uplink facility 160 uplinks traffic obstruction information from telematics service call center 150 along with other radio signals to one or more geostationary satellites 180, and one or more terrestrial radio transmitter or repeater stations 170 via satellite.

Terrestrial radio transmitter or repeater station 170 and geostationary satellite 180 transmit radio signals to satellite radio receiver 140 in mobile vehicle 110. Terrestrial radio transmitter or repeater station 170 and geostationary satellite 180 may broadcast, for example, over a spectrum in the "S" band (2.3 GHz) that has been allocated by the U.S. Federal Communications Commission (FCC) for nationwide broadcasting of satellite-based Digital Audio Radio Service (DARS). The broadcast may be, for example, a 120 kilobyte-per-second portion of the channel capacity designated for commands signals from telematics service call center 150 to mobile vehicle 110.

Telematics unit 120 monitors satellite radio system broadcast signals received by satellite radio receiver 140 for traffic obstruction information, and when this is detected, the traffic obstruction information is extracted from the broadcast channel. Telematics unit 120 may store or retrieve data and information from the signals broadcast by satellite radio receiver 140.

Wireless carrier system 140 is a wireless communications carrier such as a mobile telephone system. The mobile telephone system may be an analog mobile telephone system operating over a prescribed band nominally at 800 MHz. Alternatively, the mobile telephone system may be a digital mobile telephone system operating over a prescribed band nominally at 800 MHz, 900 MHz, 1900 MHz, or any suitable band capable of carrying mobile communications. Wireless carrier system 140 transmits to and receives signals from mobile vehicle 110. Wireless carrier system 140 may be connected with other communication and landline networks. Telematics service call center 150 may be connected to wireless carrier system 140 with a land-based network, a wireless network, or a combination of landline and wireless networks. In this manner, fully duplex communication is achieved between telematics service call center 150 and mobile vehicle 110.

Figure 2:
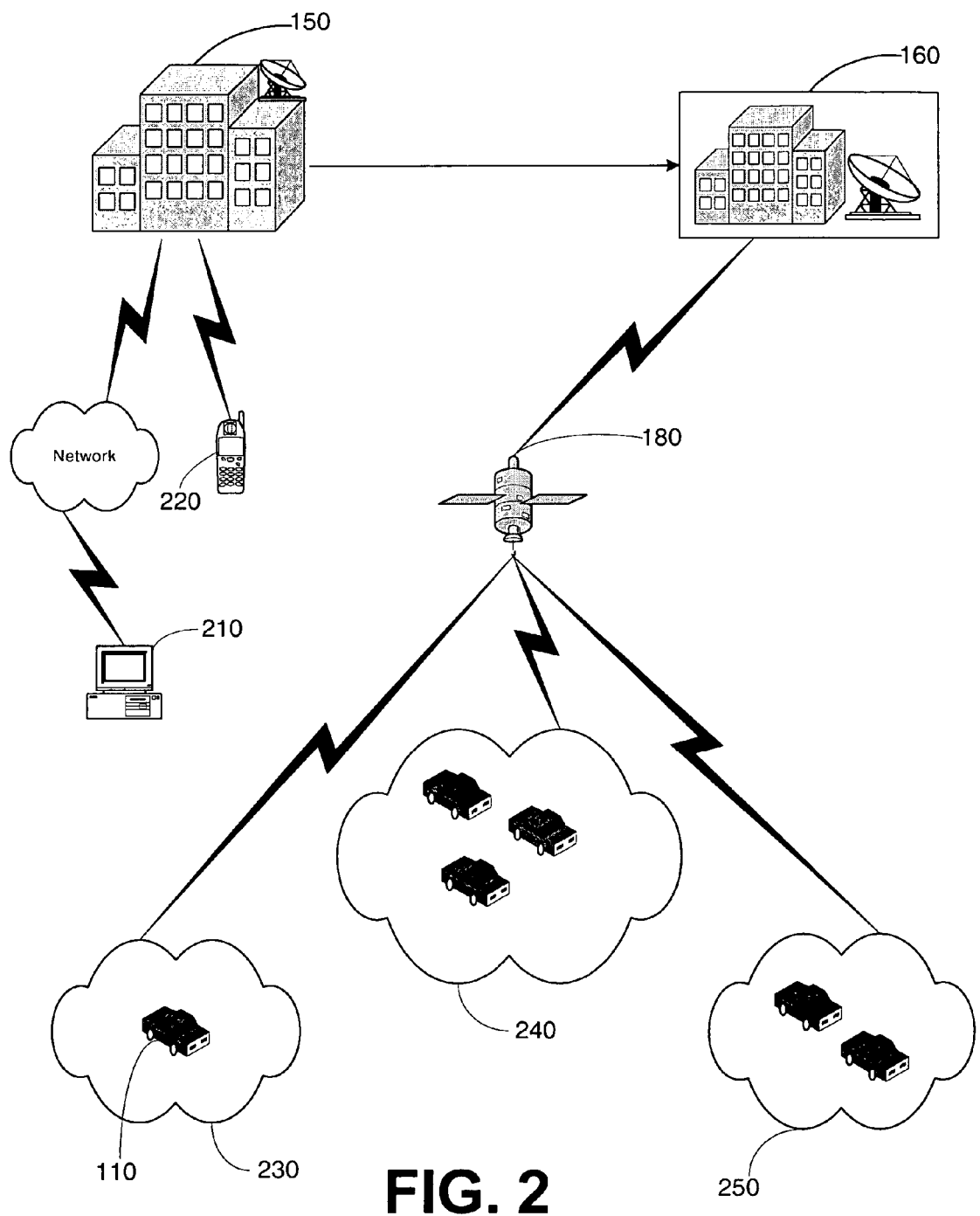
FIG. 2 is a block diagram illustrating one embodiment of the communication devices, telematics service call center, satellite, and mobile vehicle communication system, in accordance with the present invention.

FIG. 2 is a block diagram illustrating an embodiment of the present invention at 200. Like components from FIG. 1 and FIG. 2 are labeled identically. The invention relates primarily to communication between telematics service call center 150, satellite radio uplink facility 160, geostationary satellite 180, and mobile vehicle 110.

A user of mobile vehicle 110, and more generally of MCVS 100, communicates with telematics service call center 150. The user may communicate via a personal computer 210 connected to telematics service call center 150 via a network, such as the Internet. Alternatively the user may communicate with telematics service call center 150 via a land-based or cellular phone 220. Telematics service call center 150 may house servers that store route information for the user, or these servers may be accessible by telematics service call center 150 but held at a different location.

Telematics service call center 150 receives traffic update information, comprising traffic obstruction information. Traffic obstruction information may relate to a vehicle accident, physical obstruction in the roadway, traffic jam, or any other obstruction that may impede normal traffic flow. In one embodiment, traffic obstruction information includes a precise location of a specific obstruction, an obstructed area, roads affected by said obstruction, and other information relating to the obstruction. Traffic obstruction information is communicated from telematics service call center 150 to satellite radio uplink facility 160. The traffic obstruction information is then broadcast via terrestrial radio transmitter or repeater station 170, or via geostationary satellite 180, to mobile vehicle 110.

As traffic obstruction information relates to a location, it may be classified as located within a broadcast subarea, such as broadcast subareas 230, 240, and 250. A broadcast subarea is a defined geographic area, such as a metropolitan area. An example of possible broadcast areas might include broadcast subarea 230 as the Chicago metropolitan area, broadcast subarea 240 as the Los Angeles metropolitan area, and broadcast subarea 250 as the New York metropolitan area. Information regarding any traffic obstruction may be designated as occurring within or relevant to one or more broadcast subareas. At any time mobile vehicle 110 is located within the defined geographic area of zero, one, or multiple broadcast subareas.

Figure 3:
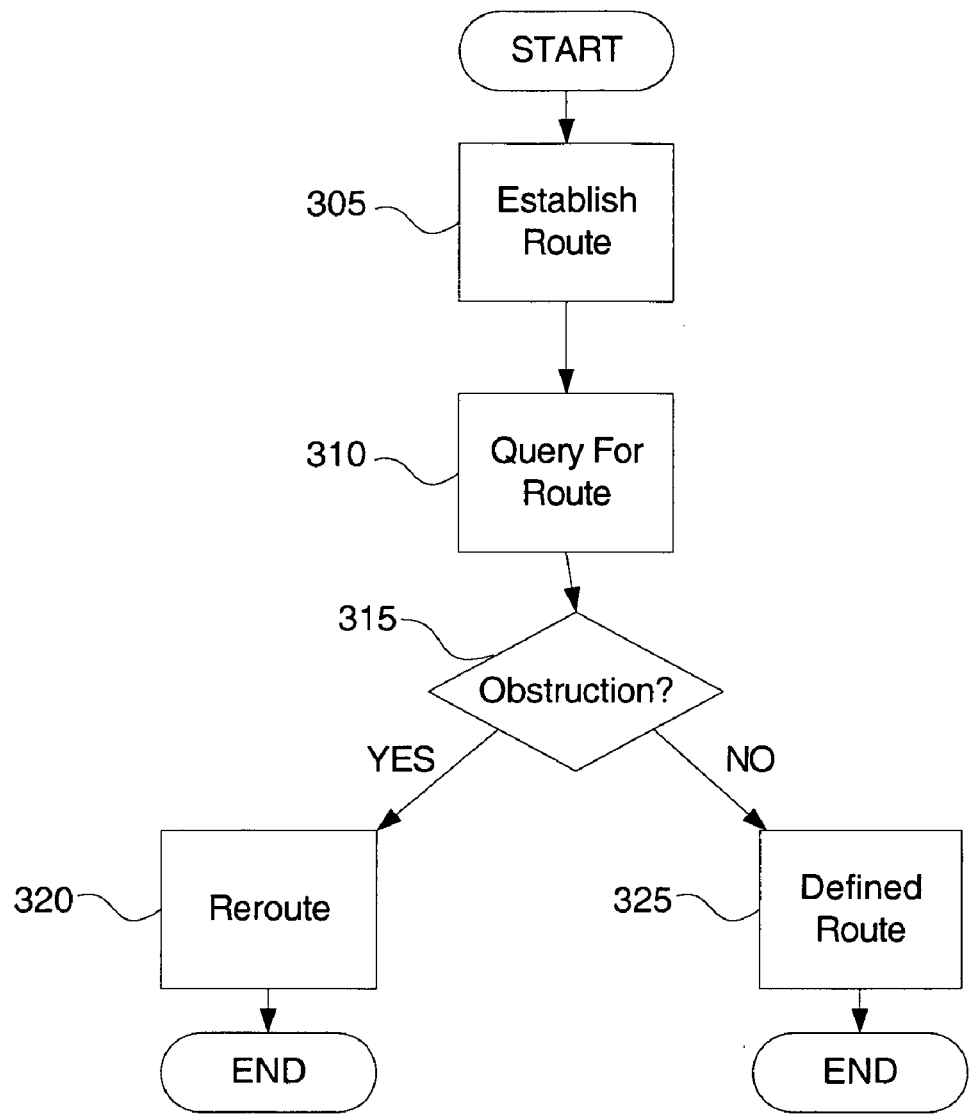
FIG. 3 is a flowchart representation of one embodiment of the standard definition and retrieval process for route and traffic obstruction information, in accordance with the present invention.

FIG. 3 is a flowchart representation of one embodiment of the standard definition and retrieval process for route and traffic obstruction information, in accordance with the present invention at 300. A user of mobile vehicle 110 may at any time communicate with telematics service call center 150 to establish route information (Block 305). Route information may include a place of origination, a destination, and a defined path to the destination. Route information may include any combination of road names, distances, directions to turn, or other information that may guide the user from the point of origination to the destination. Route information held on the route information storage and retrieval system may be established or edited by a user of mobile vehicle 110 over a network using personal computer 210, land-based or cellular phone 220, telematics unit 120, in-vehicle mobile phone 134, or any other means provided by telematics service call center 150. In one embodiment, telematics service call center 150 has a web site available on the Internet, established as an interface with said route information system, and accessible via personal computer 210.

In one embodiment, a user of mobile vehicle 110 contacts telematics service call center 150 when mobile vehicle 110 is to embark upon an established route. This contact may be achieved by the telematics unit in the mobile vehicle, and may consist of a query for route information (Block 310) pertaining to the established route. When said query is received at telematics service call center 150, telematics service call center 150 checks for a traffic obstruction (Block 315) on the established route. If telematics service call center 150 has traffic obstruction information that exists on the established route, telematics service call center 150 transmits reroute information (Block 320) to mobile vehicle 110. Reroute information is information providing an alternate route to the destination, directing mobile vehicle 110 to avoid the traffic obstruction. If no traffic obstruction information exists that is relevant to the requested route, telematics service call center 150 transmits the standard route information (Block 325) to mobile vehicle 110.

Figure 4:
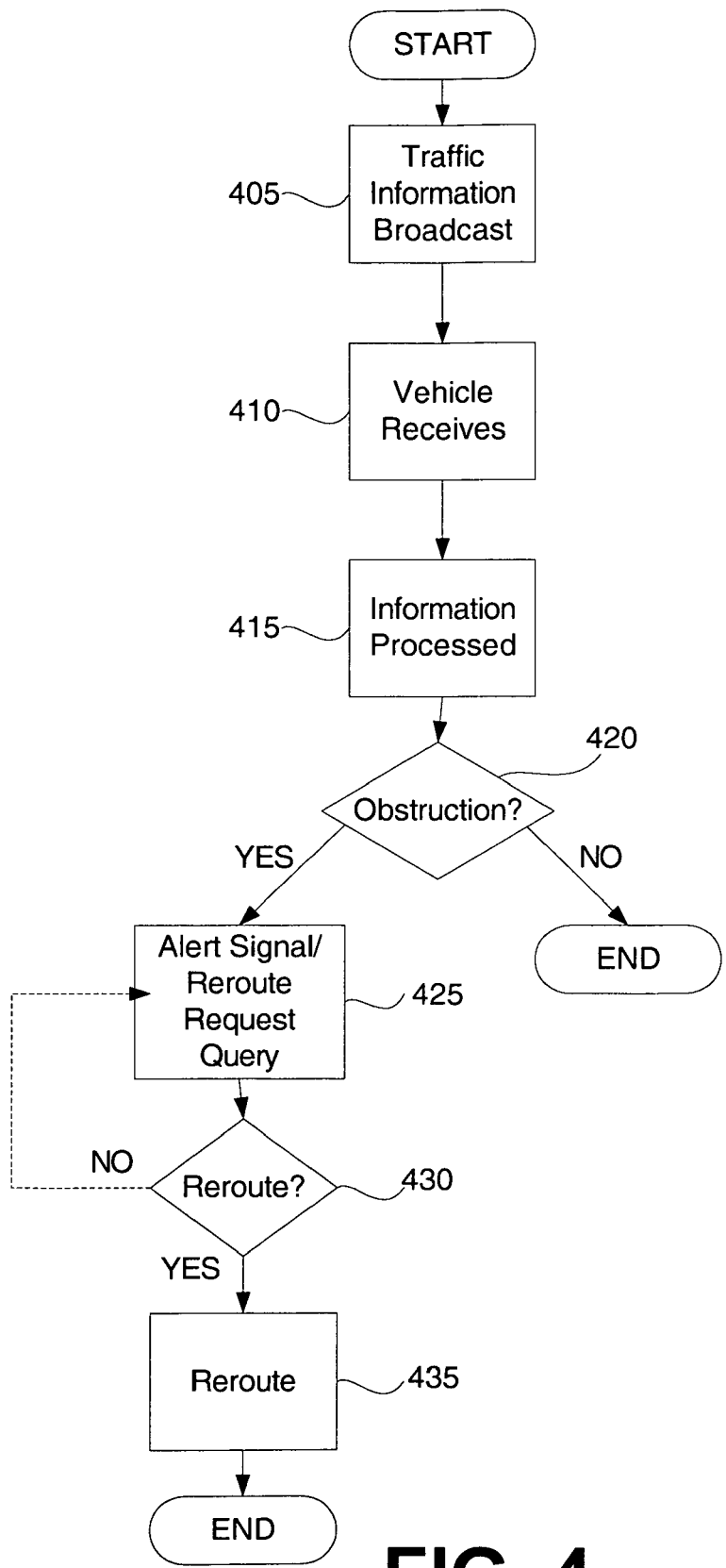
FIG. 4 is a flowchart representation of one embodiment of an interaction between a telematics service call center, satellite system providing traffic obstruction information, and a mobile vehicle, in accordance with the present invention.

FIG. 4 is a flowchart representation of one embodiment for communicating traffic obstruction information, in accordance with the present invention at 400. Telematics service call center 150 communicates traffic obstruction information to satellite radio uplink facility 160. The traffic update information may be broadcast (Block 405) via geostationary satellite 180 or via terrestrial radio transmitter or repeater station 170.

In one embodiment, the traffic obstruction information is sent on channel capacity of the standard satellite broadcast. In one embodiment, the traffic obstruction information is grouped by broadcast subarea 230, 240, 250. In one embodiment, the grouped traffic obstruction information may be broadcast in slots, or time intervals, using a multiplexing strategy such as Time Division Multiple Access (TDMA).

The route, or routes, currently being traveled may be determined by collectively viewing those requested through a query for route information (Block 310). Telematics service call center 150 may compare the currently traveled route information with received traffic obstruction information. In one embodiment, telematics service call center 150 would only provide for broadcast traffic obstruction information that describes a traffic obstruction on a route, or routes, currently being traveled. Sending only this select information lowers the bandwidth required for broadcasting the traffic obstruction information, freeing portions of said bandwidth for other uses.

Mobile vehicle 110 receives via satellite radio receiver 140 the broadcast traffic obstruction information (Block 410). In one embodiment, telematics unit 120, in conjunction with its component global positioning system (GPS) unit 126, establishes in what broadcast subarea, if any, mobile vehicle 110 is located. In one embodiment, the current broadcast subarea of mobile vehicle 110 is used to select the appropriate TDMA encoded traffic obstruction information. The traffic obstruction information is processed (Block 415) by a telematics unit 120. In one embodiment, telematics unit 120 processes the information based upon a defined route currently being traveled by mobile vehicle 110. The route may be transmitted reroute information (Block 320) or standard route information (Block 325) as described above.

Telematics unit 120 then determines if any of the processed traffic obstruction information indicates a traffic obstruction (Block 420) ahead on the route currently being traveled by mobile vehicle 110. In one embodiment, if no obstruction exists, telematics unit 120 ends processing and waits for additional traffic obstruction information updates. In one embodiment, the telematics unit 120 may include in its determination whether the obstruction lies ahead of the mobile vehicle, or whether it has already been passed. In one embodiment, if telematics module 120 determines that there is a traffic obstruction en route, the module sends an alert signal (Block 425).

An alert signal is any visual or audible signal that indicates to the mobile vehicle user that a traffic obstruction is on the current route. In one embodiment, the alert signal may be an audible signal such as a tone, or may be an audible message. Alternatively, the alert signal may be a visual cue such as a flashing light, or text display on a dashboard or a heads up display. In one embodiment the alert signal may include information regarding the traffic obstruction such as the type of obstruction and the mobile vehicle's proximity to the traffic obstruction. In one embodiment the alert signal includes a reroute request query. A reroute request query is any alert signal that indicates to a user that the user may wish to request new route information.

In one embodiment, a user of mobile vehicle 110 determines whether or not to request reroute information (Block 430). In one embodiment, if the user determines not to request reroute information, the mobile vehicle user may later receive alert signals based on the same traffic obstruction. In one embodiment, the mobile vehicle user may specifically decline to receive an alert signal based on a previously reported traffic obstruction. The user may alternatively determine to request reroute information (Block 435). Reroute information is then provided to the mobile vehicle user.

The above-described methods and implementation for receiving traffic update information and reroute information from a telematics service call center in a mobile vehicle are example methods and implementations. These methods and implementations illustrate one possible approach for receiving traffic update information and reroute information from a telematics service call center in a mobile vehicle. Moreover, various other improvements and modifications to this invention may occur to those skilled in the art, and those improvements and modifications will fall within the scope of this invention as set forth below.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method for receiving traffic update information and reroute information from a call center in a mobile vehicle, the method comprising:
   receiving traffic obstruction information at the telematics call center;
   classifying the traffic obstruction information within a broadcast subarea;
   transmitting the classified traffic obstruction information from the call center to a satellite broadcast radio uplink facility; and
   broadcasting the classified traffic obstruction information to at least one mobile vehicle.

2. A method for receiving traffic update intonation and reroute information from a call center in a mobile vehicle, the method comprising:
   receiving traffic obstruction information at the telematics call center;
   classifing the traffic obstruction information within a broadcast subarea, wherein the classifying the traffic obstruction information comprises encoding the traffic obstruction information using a multiplexing strategy;
   transmitting the classified traffic obstruction information from the call center to a satellite radio uplink facility; and
   broadcasting the classified traffic obstruction information to at least one mobile vehicle.

3. The method of claim 2 wherein the multiplexing strategy is time division multiple access.

4. A method for receiving traffic update information and reroute information from a call center in a mobile vehicle, the method comprising:
   receiving route information from the call center at the mobile vehicle;
   contacting the call center upon embarking on travel based on the route information, the contacting including:
   receiving broadcast traffic obstruction information via a satellite broadcast radio subcarrier;
   determining whether the received broadcast traffic information indicates a traffic obstruction on at least one current route; and
   transmitting a reroute information request to the call center using a wireless carrier system; and
   receiving reroute information based on the contacting the call center.

5. A method for transmitting reroute information to a mobile vehicle from a call center, the method comprising:
   transmitting route information to the mobile vehicle in response to a route request from the mobile vehicle;
   receiving, at the call center, broadcast traffic information via a satellite broadcast radio subcarrier;
   receiving a query from the mobile vehicle;
   determining whether the traffic information is relevant to the route information; and
   transmitting reroute information to the mobile vehicle in response to the determining.

6. The method of claim 5 wherein transmitting route information comprises determining at least one current route.

7. The method of claim 6 wherein determining whether the traffic information is relevant to the route information comprises determining whether the received broadcast traffic information indicates a traffic obstruction on the at least one current route.

* * * * *